United States Patent [19]
Harbottle

[11] 3,830,633
[45] Aug. 20, 1974

[54] METHOD AND APPARATUS FOR ADJUSTING TAPERED ROLLER BEARINGS AND FOR ASSEMBLING DEVICES EMPLOYING SUCH BEARINGS AS JOURNALS

[75] Inventor: William E. Harbottle, Canton, Ohio
[73] Assignee: The Timken Company, Canton, Ohio
[22] Filed: Sept. 18, 1973
[21] Appl. No.: 398,421

Related U.S. Application Data
[62] Division of Ser. No. 237,462, March 23, 1972, Pat. No. 3,785,023.

[52] U.S. Cl. .......................... 29/148.4 A, 29/201 R
[51] Int. Cl. ....................... B23p 11/00, B23p 19/04
[58] Field of Search .... 29/148.4 A, 201 R, 148.4 R, 29/201 D, 200 R

[56] References Cited
UNITED STATES PATENTS
2,101,130  12/1937  Christman ...................... 29/148.4 A
2,762,112  9/1956  Kylen ............................. 29/148.4 A Primary Examiner—Thomas H. Eager
Attorney, Agent, or Firm—Gravely, Lieder & Woodruff

[57] ABSTRACT

A shaft is journaled in a shaft housing by means of a pair of tapered roller bearings, and the assembly of the foregoing structure, including the adjustment of the tapered roller bearings, is performed on an assembly tool having a fixed anvil and a shiftable pilot base which moves against a spring load toward the anvil. In addition, the tool includes a carriage which shifts axially relative to the anvil against a spring bias and may be locked in a fixed axial position. To assemble the foregoing structure the cone assembly of one of the bearings is fitted against an abutment on the shaft, while the cup of that bearing is seated in the housing. Next the shaft is supported on the shiftable carriage of the tool and thereafter the housing is fitted over the shaft and supported on the pilot base, with its cup receiving the cone assembly. Next an axial force is applied to the housing in the direction which seats the rollers of the bearing, so that the force is transmitted to the shaft through the bearing. The force depresses the pilot base against the anvil while depressing the carriage in opposition to the spring load thereon. Once the pilot base engages the anvil, the carriage is locked in position, and the housing is allowed to return to its initial position so that a prescribed or working point clearance exists between the anvil and pilot base and likewise in the bearing. With the other cup seated in the housing, the remaining cone assembly, which is shiftable along the shaft to effect adjustment of the two bearings, is advanced along the shaft toward its cup, and when the rollers of that bearing seat, a portion of the axial force is transmitted to the housing, and the housing is again depressed along with the pilot base. The advancement is continued until the clearance in the first installed bearing reaches a prescribed valve, and that clearance is ascertained by measuring the distance between the pilot base and the anvil. The shaft is rotated slowly as the rollers of the two bearings are seated against their respective cups and cones to insure proper seating.

17 Claims, 7 Drawing Figures

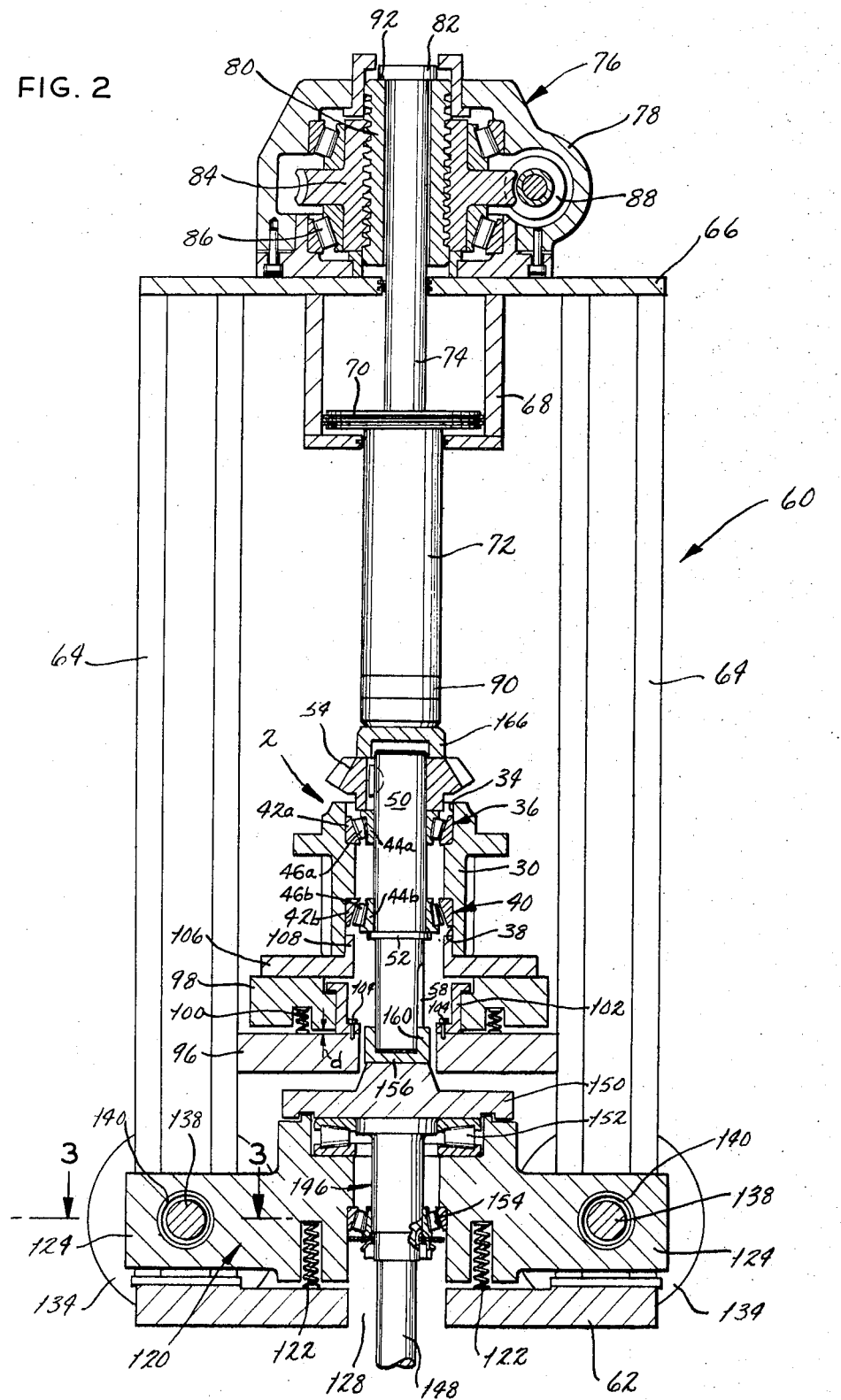

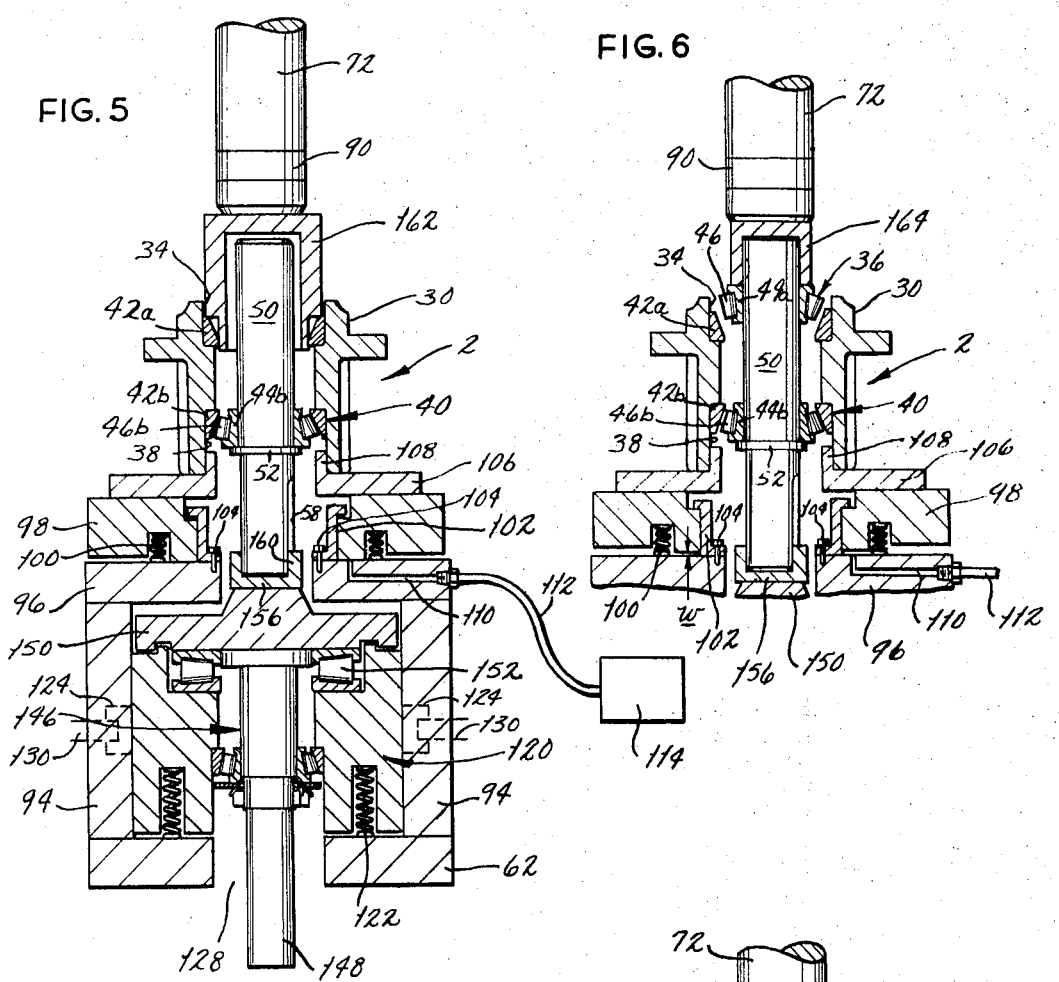

METHOD AND APPARATUS FOR ADJUSTING TAPERED ROLLER BEARINGS AND FOR ASSEMBLING DEVICES EMPLOYING SUCH BEARINGS AS JOURNALS

This is a division of application Ser. No. 237,462, filed Mar. 23, 1972, U.S. Pat. No. 3,785,023.

BACKGROUND OF THE INVENTION

This invention relates in general to bearings and more particularly to a method and apparatus for adjusting tapered roller bearings and for assembling apparatus employing such bearings.

One of the more common means for journaling a shaft in the housing of a gear box or the like is to extend the shaft through a pair of single row tapered roller bearings set into the housing. These bearings possess the capability of carrying thrust loading as well as radial loading, and when mounted in opposition to one another thrust loads in both axial directions are taken.

One of the final procedures required in the assembly of such a journal construction is the adjustment of one tapered roller bearing against the other to eliminate excessive radial and axial play or free motion in the shaft so that the shaft will run true within the housing. This adjustment demands considerable precision and often involves measurements to within one-thousandth of an inch. It may be a difficult and time-consuming procedure. Currently, the adjustment is usually effected by turning an adjusting nut down against a bearing until the proper adjustment is achieved. This of course requires threading of the shaft with the addition of an adjustment nut and a washer. It is a time-consuming manual process.

SUMMARY OF THE INVENTION

The principal object of the present invention is to provide a method and apparatus for quickly and accurately adjusting tapered roller bearings. Another object is to provide a method and apparatus of the type stated for installing a shaft in a housing with tapered roller bearings. A further object is to provide a method and apparatus of the type stated which is ideally suited for assembly line use and which does not require highly skilled labor. An additional object is to provide a method and apparatus which enables bearings to be adjusted without using shims, or other devices, such as spacers, locknuts, etc. These and other objects and advantages will become apparent hereinafter.

The present invention is embodied in a tool on which a shaft may be installed in a housing by means of tapered roller bearings. The tool has a shiftable element, the movement of which is correlated to the clearance in the bearings so that the adjustment of the bearing is ascertained by the position of that element. The invention also resides in the process for adjusting the bearings and for assembling the housing, bearings, and shaft with the tool. The invention also consists in the parts and in the arrangements and combinations of parts hereinafter described and claimed.

DESCRIPTION OF THE DRAWINGS

In the accompanying drawings, which form part of the specification and wherein like numerals refer to like parts wherever they occur:

FIG. 2 is a section view in elevation of the assembly tool with the assembled component thereon;

FIG. 5 is a fragmentary sectional view similar to FIG. 2 but taken along a plane perpendicular to the plane of FIG. 2 and showing the tool after the initial force is applied to the housing and the pilot base and carriage of the tool are depressed;

FIG. 6 is a fragmentary sectional view similar to FIGS. 2 and 5 and showing the cone of one of the bearings being installed on the shaft while the tool carriage is locked in the depressed position; and FIG. 7 is a fragmentary sectional view similar to FIGS. 5 and 6 and showing a second force being applied through the bevel gear to the last installed cone and the position of the parts as the measurements are taken.

DETAILED DESCRIPTION

Figure 1:
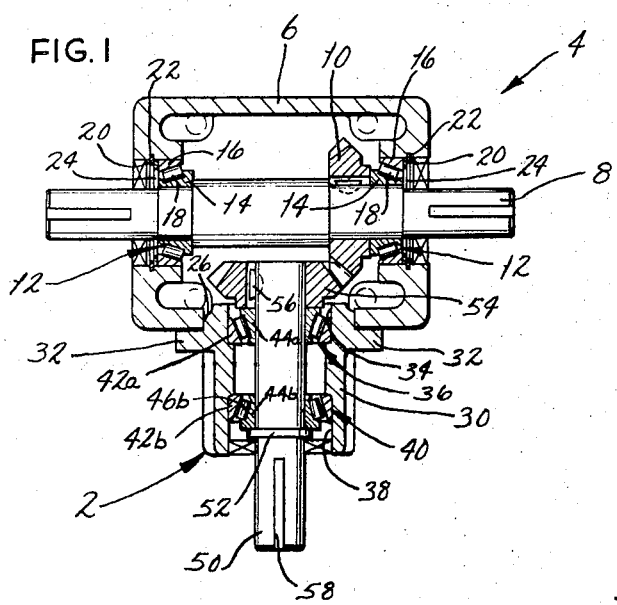
FIG. 1 is a sectional view of a gear box including bevel pinion shaft subassembly and housing with indirectly mounted single row tapered roller bearings which is assembled and adjusted on the assembly tool of the present invention.

Referring now to the drawings, the method and apparatus of the present invention may be employed to assemble a subassembly or component 2 which forms part of a gear box 4 (FIG. 1) having a primary housing 6 to which the subassembly 2 is fastened. Extending completely through the housing 6 is a shaft 8 to which a bevel gear 10 is keyed, and this shaft is journaled in the housing 6 by means of a pair of tapered roller bearings 12 which are directly mounted and hence in opposition to each other so that the shaft 8 carries thrust loading in either axial direction. Each tapered roller bearing 12 includes a cone 14 encircling the shaft 8 and positioned against an abutment along the shaft 8, a cup 16 set into the primary housing 6, and a plurality of tapered rollers 18 interposed between the cone 14 and cup 16 and engaged with the opposed raceways thereof. The shaft 8 and the bevel gear 10 which it carries are axially positioned by the bearings 12, and the bearings 12 are in turn axially positioned within the housing by a pair of snap rings 20 which fit in annular grooves 22 located outwardly from the cups 16. The bearings 12 are adjusted by inserting shims 24 between the snap rings 20 and the cups 16, and this adjustment substantially eliminates all axial and radial play in the bearings 12 and the shaft 8.

The subassembly 2 is fastened to the primary housing 6 and projects into the housing 6 through an opening 26 in one side thereof. While the shaft 8 and bearings 12 may be assembled in the primary housing 6, in accordance with conventional procedures, the subassembly or component 2 is assembled more rapidly and with more precision by employing the process and apparatus of the present invention.

The subassembly 2 includes (FIG. 1) a shaft housing 30, one end of which is sized to project into the opening 26 of the primary housing 6. To secure the housing 30 to the primary housing 6, a flange 32 is provided on the former which is fastened against the latter. At one end the housing 30 is provided with a counterbore 34 which opens into the interior of the primary housing 6, and disposed within this counterbore 34 is a single row tapered roller bearing 36. At its opposite end the housing 30 is provided with another counterbore 38 which opens outwardly, and located within this counterbore is another single row tapered roller bearing 40. The tapered roller bearing 36 includes a cup 42a, a cone 44a, and plurality of tapered rollers 46a interposed between and engaged with the tapered raceways of the cup 42a and cone 44a, while the bearing 40 includes a cup 42b, a cone 44b and rollers 46b. The cups 42a,b for the bearings 36 and 40 are seated in the counterbores 34 and 38, respectively, against the shoulders at the ends thereof, a tight fit being employed. The cups 42a,b are oriented such that their back faces, that is their end faces at the small diameter ends of the raceways, are adjacent the shoulders in the counterbores 34 and 38 so that the bearings 36 and 40 are indirectly mounted.

The cones 44a, b of the two bearings 36 and 40 receive a shaft 50 which projects beyond both ends of the housing 30 and again, a tight fit is employed. The shaft 50 has an integrally formed shoulder or flange 52 against which the back face or large diameter end of the cone 44b for the bearing 40 abuts. The opposite end of the shaft 50 carries a bevel gear 54 which meshes with the bevel gear 10 on the shaft 8. A tight fit exists between the diameter of the shaft 50 and the gear 54, and the gear 54 is further prevented from rotating relative to the shaft 50 by a Woodruff key 56. The gear 54 abuts against the back face of the cone 44a for the bearing 36, and consequently the adjustment of the two tapered roller bearings 36 and 40 is dependent on the position of the gear 54 along the shaft 50. The exposed end of the shaft 50 has a keyway 58.

The subassembly 2 is assembled with a tool or fixture 60 (FIG. 2) including a fixture base 62 and side rails 64 projecting upwardly therefrom. The upper ends of the rails 64 are fastened to an upper platen 66 which carries a hydraulic cylinder 68 containing a movable piston 70. Extending axially from the piston 70 are a ram rod 72 and a fine adjustment shaft 74, the former extending downwardly through the lower end of the cylinder 68, and the latter projecting upwardly through the upper end of the cylinder 68 and into a micro-adjusting unit 76 mounted on the platen 66. The unit 76 includes a casing 78 which is bolted to the top plate 66 and contains a threaded sleeve 80 which encircles the adjusting shaft 74 with a collar 82 thereon. The threads of the sleeve 80 are presented outwardly and mesh with the internal threads of an encircling worm wheel 84 which is journaled in a pair of directly mounted single row tapered roller bearings 86 carried by the casing 78. The worm wheel 84, in turn, meshes with a worm 88 which is journaled in the casing 78 and is rotated by a remotely controlled motor (not shown). The ram rod 72 has a swivel joint 90 at its lower end, and interposed between the collar 82 at the upper end of the micro-adjustment shaft 74 and the end of the threaded sleeve 80 is a microswitch 92.

The fixture base 62 includes a pair of upstanding members 94 (FIG. 5) which support an anvil 96, the hollow center of which is coaxial with ram rod 72. The anvil 96, in turn, supports an annular pilot base 98, and interposed between the pilot base 98 and anvil 96 is a set of coil springs 100 for urging the base 98 upwardly into an elevated position. A flanged retainer 102 is fastened to the anvil 96 by bolts 104 and projects upwardly through the hollow center of the pilot base 98 to radially position the pilot base 98 on the anvil 96. The flanged portion of flanged retainer 102 projects outwardly into a relieved portion of the pilot base 98 and thereby limits the distance the springs 100 urge the pilot base 98 away from the anvil 96. This distance is termed the known working point clearance w. The pilot base 98 supports an annular carrier pilot 106 having guide ring 108 which projects upwardly at the inner margin thereof and is sized to fit freely into the counterbore 38 of the housing 30. The carrier pilot 106 may be detached from the pilot base 98 and replaced with another carrier pilot 106 having a guide 108 capable of accommodating a housing 30 with a counterbore 38 of different diameter.

To ascertain the clearance or spacing between the pilot base 98 and the anvil 96, the latter is provided with an air passageway 110 (FIG. 5) which terminates directly beneath the pilot base 98 and that end is covered and blocked by the pilot base 98 when the pilot base 98 is pressed downwardly against the anvil 96. The opposite end of the passageway 110 is connected to a pneumatic line 112 which in turn is connected to a pneumatic sensing device 114. Through the sensing device 114, compressed air is introduced into the line 112 and the passageway 110, and that air discharges from the end of the passage located between the opposed faces of the anvil 96 and the pilot base 98. The back pressure within the passageway 110 and the line 112 is dependent on the clearance between the anvil 96 and pilot base 98, and is detected by the sensing device 114 which registers that back pressure in terms of distance, namely, thousandths of an inch. The pneumatic sensing device 114 is a conventional air gauge measuring apparatus and therefore will not be described in further detail.

In addition to the foregoing, the tool 60 includes a bridge or carriage 120 (FIG. 2) which is located beneath the anvil 96 and between the upstanding members 94, and is supported on the base 62 by means of coil springs 122. The carriage 120 has a pair of ears 124 which project outwardly past the side rails 64 and have generally V-shaped grooves 126 (FIG. 3) into which the side rails 64 fit. In particular, both the ears 124 at the grooves 126 have beveled surfaces which are presented opposite to beveled surfaces on the side rails 64. The carriage 120 has a center bore 128, the axis of which is coaxial with respect to the anvil 96 and flanged retainer 102, as well as with the ram rod 72.

Figure 3:
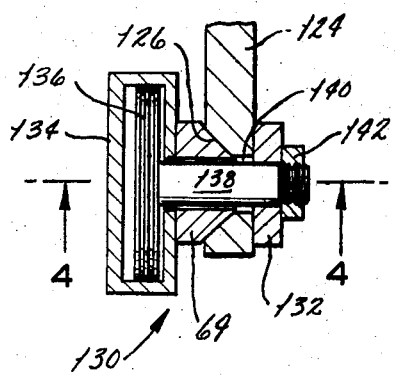
FIG. 3 is a sectional view taken along line 3—3 of FIG. 2 and showing a clamping device forming part of the present invention.
Figure 4:
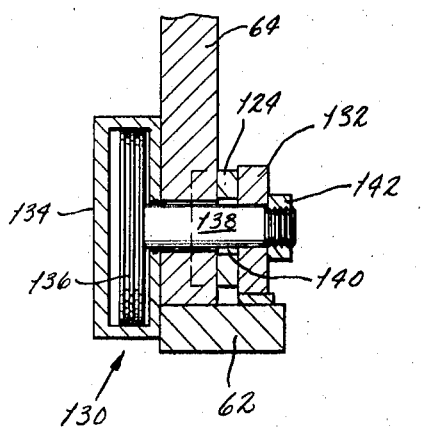
FIG. 4 is a sectional view taken along line 4—4 of FIG. 3.

While the ears 124 and the carriage 120 from which they project are normally free to move upwardly and downwardly a limited distance with respect to the fixture base 62, they may be locked to the base 62 by means of clamping devices 130 (FIGS. 3 and 4). Each clamping device 130 includes a pair of mounting brackets 132 which rest on the base 62 and project upwardly past the back side of one of the ears 124 so that each ear 124 is interposed between a rail 64 and a bracket 132. The actual clamping or locking is effected by means of a hydraulic cylinder 134 which is positioned against the back side of the side rail 64 and contains a piston 136 having a piston rod 138 projecting from one end thereof. The piston rod 138 extends in order through the side rail 64, through an enlarged bore 140 in the carriage ear 124, and through the mounting bracket 132, and is retained in place by a nut 142 which threads over its outer end and bears against the mounting bracket 132. The bore 140 is somewhat larger than the piston rod 138 so that the carriage 120 is afforded a limited amount of free motion in the vertical direction when the clamping device 130 is disengaged.

To actuate the clamping device 130 high pressure fluid is directed against the back face of the piston 136, that is the face from which the piston rod 138 extends, and this draws the nut 142 toward the hydraulic cylinder 134, clamping the side rail 64 and the ear 124 between the mounting bracket 132 and the cylinder case 134. This, in turn, brings the beveled faces of the V-shaped grooves 126 into tight abutment with the beveled faces of the side rails 64 (FIG. 3) so that the ears 124 and carriage 120 are no longer free to shift relative to the base 62.

The carriage 120 supports a rotating spindle 146 (FIGS. 2 and 5) including a shank 148 which is disposed in the center bore 128 and an enlarged head 150 which projects radially over the upper surface of the carriage 120. At its upper end the carriage 120 is recessed to accommodate a tapered roller thrust bearing 152 on which the head 150 of the spindle 146 rests so that downwardly directed forces applied to the spindle 146 are transferred to the carriage 120 through the bearing 152. The center bore 128 further houses a single row tapered roller bearing 154 which encircles the shank 148 beneath the tapered roller thrust bearing 152 and keeps the spindle 146 centered on the carriage 120. The head 150 of the spindle 146 carries shaft adapted 156 which rotates within the center opening of the anvil 96 and has an upwardly opening socket sized to receive the outwardly presented end of the shaft 50. Projecting into that socket from the surrounding wall of the adapter 156 is a lug 160 which fits into the keyway 58 of the shaft 50 and prevents the shaft 50 from rotating relative to the spindle 146. The adapter 156 is detachable from the spindle head 150 so that shafts 50 of different sizes may be accommodated by the tool 60. The shank 148 of the spindle 146 projects below the fixture base 62 where it is connected to a suitable drive mechanism (not shown) and that drive mechanism rotates the shaft 50 at about 10 r.p.m.

OPERATION

To assemble the gear box subassembly 2 with the assembly tool 60, the cone 44b of the lower tapered roller bearing 40 is pressed over the shaft 50 and against the shaft shoulder 52 with a standard production press. Likewise, the cup 42b of the lower bearing 40 is pressed into the counterbore 38 of the housing 30 until it seats against the shoulder at the end thereof, also with a standard production press. Next the outwardly projecting end of the shaft 50, that is the end having the keyway 58, is inserted into the socket of the adapter 156 such that the lug 160 fits into the keyway 58. Thus, the shaft 50 is supported on the spindle 146 as an upward extension thereof and rotates with the spindle 146. Thereafter, the housing 30 is installed over the shaft 50, and its counterbore 38 is aligned with the guide ring 108 on the carrier pilot 106, so that the guide ring 108 fits loosely into the counterbore 38 and aligns the cup 12b of the lower bearing 40 with the cone 44b and its complement of rollers 46b. At this juncture, the tapered rollers 46b of the lower bearing 40 may or may not seat against the raceways of the cup 42b and cone 44b for that bearing.

Once the housing 30 is fitted over the shaft 50 and is engaged with the guide ring 108 of the carrier pilot 106, the cup 42a of the upper bearing 36 is aligned with the counterbore 34 at the opposite end of the housing 30 and is forced into the counterbore 34 by the ram rod 72 (FIG. 5). At about the same time the drive mechanism which rotates the spindle 146 is also activated. The force exerted by the ram rod 72 is derived from the hydraulic cylinder 68 and is transmitted to the cup 42a by means of a press adapter 162 which fits around the upwardly projecting end of the shaft 50 and enables the ram rod 72 to engage and press the cup 42a without interferring with the shaft 50 or counterbore 34. In this connection, the counterbore 34 is sized so that a tight fit exists with the cup 42a. As the cup 42a is pressed into the counterbore 34, the downwardly directed force applied by the ram rod 72 with the spindle rotating at about 10 r.p.m. seat the rollers 46b of the lower bearing 40 against the opposed raceways of the cup 42b and cone 44b, and this force is transmitted through the seated lower bearing 40 to the shaft 50 and thence to the spindle 146 through the shaft adapter 156. The tapered roller thrust bearing 152 in turn transmits that force from the spindle 146 to carriage 120 where it is resisted by the carriage springs 122. Thus, the opposing force exerted by the carriage springs 122 coupled with the rotation of the shaft 50 by the spindle 146 insures that the lower bearing 40 remains properly seated.

The downwardly directed force is also transmitted through the housing 30 to the face of the carrier pilot 106, and when this occurs, the force drives the pilot base 98 downwardly against the opposing force exerted by the pilot base springs 100. After moving downwardly a distance equal to the working point clearance w, the pilot base 98 comes to rest on the anvil 96. Of course, the downward movement of the pilot base 98 is in conjunction with the downward movement of the spindle 146 and carriage 120, and when the pilot base 98 contacts the anvil 96 and thereby comes to rest, the axial movement of the spindle 146 and carriage 120 also terminates. The carriage 120, however, does not seat against fixture base 62.

The force applied by the ram rod 72 should be sufficient to seat the cup 42a of the upper bearing 36 against the shoulder at the end of the upper counterbore 34, and to further depress the pilot base 98 into with iwth the anvil 96. In the alternative, the upper cup 42a may be seated in the counterbore 34 by a standard production press before the placement of the housing 30 on the carrier pilot 106 and contemporaneously with the seating of the other cup 42b in the counterbore 38. In that case the force supplied by the ram rod 72 is used only to depress the pilot base 98 and carriage 120.

While the pilot base 98 is held in engagement with the anvil 96, the clamping devices 130 are actuated by directing hydraulic fluid into the cylinders 134 such that the pistons 136 retract their piston rods 138 further into the cylinders 134. This clamps the ears 124 of the carriage 120 between the side rails 64 and the mounting brackets 132 (FIGS. 3 and 4), and hence the beveled faces of the side rails 64 and carriage ears 124 are forces tightly together, thus locking the carriage 120 in the depressed position. Accordingly, the spindle 146 and shaft 50, including the lower cone 44a thereon, are also supported in the depressed position.

Thereafter, the ram rod 72 is retracted by its cylinder 68 and the press adapter 162 is removed. When the ram rod 72 withdraws, the pilot base springs 100 force the pilot base 98 upwardly until it again contacts the flanged portion of the flanged retainer 102 so that the working point clearance $w$ (FIG. 6) again exists between the pilot base 98 and the anvil 96. Of course, as the pilot base 98 moves upwardly so does the housing 30 which is in effect supported thereby, and since the shaft 50 is retained in the depressed position by the clamping devices 130, the known working point clearance $w$ will also appear in the lower bearing 40. In other words, the upward movement of the housing 30 due to the expansion of the pilot base springs 100 is not duplicated in the shaft 50, since the spindle 146 and carriage 120 on which the shaft 50 is supported remain fixed in the depressed position. Therefore, the lower cup 42b and cone 44b will be axially offset from the position wherein the tapered rollers 46b seat by an amount equal to the known working point clearance $w$. An arbitrary working point clearance is selected for subassemblies 2 and that clearance is always greater than the desired bearing clearance for the two bearings 36 and 40 in the assembled subassembly 2.

Next the cone 44a of the upper bearing 36 is aligned with the upper end of the shaft 50 and is forced onto the shaft 50 by the ram rod 72 (FIG. 6), the installation force being transmitted to the cone 44a through another press adapter 164, which fits over the upper end of the shaft 50. The force applied by the ram 72 is released when the closed end adapter 164 bottoms against the shaft 50. The closed end adapter 164 is so dimensioned to allow ram 72 to be released before the tapered rollers 46 on the upper cone 44a engage the upper cup 42a in the upper counterbore 34 and after the keyway for the Woodruff key 56 is exposed.

Then the Woodruff key 56 is installed in the exposed keyway and the beveled gear 54 is placed over the end of the shaft 50 with its keyway aligned with the Woodruff key 56. The bevel gear 54 does not slip easily over the end of the shaft inasmuch as its counterbore is sized for a tight fit with the shaft 50. Although not shown, the bevel gear 54 could be assembled onto the shaft 50 by using a sleeve which would rest upon the chamfer of the shaft 50. The sleeve would have an outside diameter less than the inside diameter of the bevel gear 54, then the bevel gear 54 could be slipped over the sleeve outside diameter, thus radially positioning the bevel gear 54 with respect to shaft 50. When the bevel gear 54 is properly positioned at the end of the shaft 50 still another press adapter 166 is engaged with the bevel gear 54 and the cylinder 68 is pressurized to drive the ram rod 72 downwardly. The drive mechanisms for the spindle 146 is again activated to rotate the spindle 146. The ram rod 72 on this move forces the bevel gear 54 over the upper end of the shaft 50 and eventually brings it into engagement with the back face of the cone 44a for the upper bearing 36. Continued extension of the ram rod 72 advances the upper cone 44a with its complement of rollers 46a and the gear 54 in unison along the shaft 50. In time the rollers 46a of the upper bearing 36 will engage the upper cup 42a and will become seated against the opposed raceways of the upper cup 42a and upper cone 44, in which case the end play in the two bearings 36 and 40 will equal the known working point clearance $w$.

Once the rollers 46a of the upper bearing 36 become seated between the upper cone 44a and cup 42a (FIG. 7), that is once the end play equals the known working point clearance $w$, the pneumatic sensing device 114 is actuated and it directs high pressure air through the air line 112 and passageway 110 so that the distance $d$ between pilot base 98 and the anvil 96 is registered. When distance $d$ between pilot base 98 and the anvil 96 is reached, the clearance between lower cup 42 and rollers 46 is also equal to distance $d$. This distance $d$ equals the prescribed end play in the bearings 36 and 40, which is the free motion afforded to the shaft 50 in an axial direction.

Slightly prior to reading the working point clearance $w$ the microswitch 92 is closed by collar 82 thereby energizing the drive means for the worm 88 of the microadjusting unit 76. Thus, the cylinder 68 is still advancing the ram rod 72 but the speed of the ram rod 72 is being retarded by threaded sleeve 80. The worm 88 rotates which in turn revolves the worm wheel 84 being threaded over the sleeve 80 which retards the (downward) advancement of microadjusting shaft 74, thus retarding the advancement of the connected ram rod 72. The advance of the ram rod 72 is continued at the reduced uniform rate through the microadjustment unit 76 which retards the cylinder 68 until the distance $d$ between the pilot base 98 and the anvil 96 reaches a magnitude corresponding to the proper end play in the bearings 36 and 40, which is the clearance or distance $d$ between lower cup 42 and rollers 46 and this spacing is registered on the pneumatic sensing unit 114. At the same time that the sensing unit 114 registers the distance $d$, a brake (not shown) would be engaged to stop the ram rod 72 advancement.

In lieu of the pneumatic sensing device 114 the proper distance $d$ may also be determined by a microswitch which is positioned to close when the distance $d$ between the pilot base 98 and the anvil 96 reaches a prescribed magnitude.

Thereafter, the ram rod 72 is retracted and the subassembly 2 is removed from the tool 60. The tapered roller bearings 36 and 40 within the housing 30 will have end play equaling that registered on the pneumatic sensing device 114.

Finally, the subassembly 2 is bolted to the primary housing 6 to form the completed gear box 4.

The assembly tool 60, with slight modifications may be employed to assemble the subassembly 2 with a prescribed preload in the bearings 36 and 40. A preload condition is in effect a negative clearance in bearings—a condition existing beyond zero clearance—and in contrast to clearance, preload is usually measured in terms of force. Thus, in lieu of measuring the clearance $d$ between the pilot base 98 and the anvil 96 as the ram 72 presses the bevel gear 54 over the shaft 50, the force exerted on the housing 30 and resisted by the pilot base 98 is measured. This is achieved by placing a load cell in the anvil 96 such that the cell measures the force exerted on it by the pilot base once the rollers 46 of the lower bearing 40 seat against the raceways of the cone 44 and cup 42 of that bearing, that is once the bearings 36 and 40 pass through a condition of zero clearance.

This invention is intended to cover all changes and modifications of the example of the invention herein chosen for purposes of the disclosure which do not con-

What is claimed is:

1. A tool for adjusting bearings which journal a shaft in a housing such that radial and axial loads are taken and have races on the housing and shaft, respectively, and rolling elements interposed between and engaged with raceways on the races, said tool comprising a fixed anvil, a pilot base adjacent to the anvil and being shiftable to and from the anvil, pilot means on the pilot base for engaging the housing and positioning it in a predetermined position on the pilot base, a carriage shiftable relative to the anvil in the same direction that the pilot base shifts, shaft positioning means carried by the carriage for engaging and axially positioning the shaft, and locking means for holding the carriage in a fixed position relative to the anvil.

2. A tool according to claim 1 and further characterized by first springs for urging the pilot base and pilot means in the axial direction of the shaft, and second springs for urging the carriage in the same axial direction.

3. A tool according to claim 2 wherein the first springs urge the pilot base away from the anvil, and further characterized by measuring means for measuring the clearance between the pilot base and the anvil.

4. A tool according to claim 2 wherein the shaft positioning means comprises a spindle journaled on the carriage for rotation about an axis coincident with the axis of the supported shaft.

5. A tool according to claim 2 and further characterized by press means for exerting an axially directed force on the housing sufficient in magnitude to overcome the forces exerted by first springs, whereby the pilot base is shifted relative to the anvil.

6. A tool according to claim 3 and further characterized by limit means for limiting the distance the first springs urge the pilot base away from the anvil to a desired clearance.

7. A process for adjusting a pair of indirectly mounted single row tapered roller bearings which journal a shaft in a housing, the bearings having cups positioned against fixed abutments in the housing, cones engaged with the shaft, and tapered rollers engaged with opposed raceways on the cups and cones, one of the cones being axially positioned against a fixed abutment on the shaft and the other cone being shiftable axially along the shaft to effect adjustment of the bearings; said process comprising supporting the shaft on a spring loaded carriage which shifts axially against the spring load and relative to an anvil; supporting the housing on a spring loaded pilot base which also shifts axially and relative to the anvil; applying a force to the housing to cause it to move the pilot base against the force of the spring load on the pilot base, the movement being sufficient in magnitude and the force being great enough to cause the rollers of the bearing located adjacent to the fixed abutment on the shaft to seat against the raceways of the cup and cone for that bearing so as to load that bearing in thrust and cause the shaft to move against the spring load on the carriage; locking the carriage in a fixed position after it has been moved by the force applied to the shaft; thereafter releasing the force on the housing and allowing the spring load on the pilot base to move the pilot base away from the anvil, whereby the cup and cone of the bearing adjacent to shaft abutment are offset from their roller engaging positions; applying an axially directed force to the shiftable cone to cause the rollers of the bearing of which that cone forms a part to seat against the raceways of the cup and cone for that bearing so that the force will be transmitted through that bearing to the housing and pilot base, whereby the pilot base moves relative to the anvil; and comparing the axial position of the pilot base with the axial position it assumed upon the locking of the carriage in the fixed position.

8. The process according to claim 7 wherein the pilot base seats against the anvil when the carriage is locked in position, and wherein the axial position of the pilot base as the force is applied to the shiftable cone is compared by measuring the spacing between the pilot base and the anvil.

9. The process according to claim 7 and further characterized by rotating the shaft relative to the housing as the forces are applied to the housing and the shiftable cone.

10. A process for adjusting bearing means between an inner member and an outer member and including first and second rows of rolling elements which contact raceways carried by the inner and outer members with the one row being capable of taking thrust loading in one axial direction and the other row being capable of taking thrust loading in the other axial direction, said process comprising: causing the rolling elements of the first row to seat against the raceways for that row by applying a force to one of the members and an opposite reaction force to the other member so that the force is transmitted between the members through the rolling elements of the first row; holding said other member in a fixed axial position with respect to a first reference means located remote from the first row while the rolling elements of the first row remain seated; moving said one member with respect to said other member in the axial direction opposite to that which causes the rolling elements of the first row to seat against its raceways while said other member is maintained in the fixed axial position with respect to the first reference means so that a clearance is established between the rolling elements of the first row and their raceways; causing the rolling elements of the second row to seat against the raceways for that row; moving the rolling elements of the second row in an axial direction to reduce the clearance in the first bearing; determining the adjustment of the first bearing at the first reference means; and terminating axial movement of the rollers of the second bearing when the adjustment reaches a prescribed value.

11. A process according to claim 10 and further characterized by moving said one member with second reference means which remain in a fixed axial position with respect to said one member as said one member moves to change the clearance in the first bearing.

12. A process according to claim 11 wherein the adjustment of the first row is determined by comparing the relative positions of the first and second reference means at the time when the rolling elements of the first row are seated against their raceways and at the time the rolling elements of the second row are moved axially to reduce the clearance in the first row.

13. A process according to claim 11 wherein the adjustment of the first row is determined by ascertaining the distance between the two reference means.

14. A process according to claim 13 wherein the second reference means seat against the first reference means when rollers of the first row are seated against their raceways and said other member is held in a fixed axial position with respect to the first reference means.

15. A process for adjusting bearing means between an inner member and an outer member and including first and second rows of rolling element which contact raceways carried by the inner and outer members with the one row being capable of taking thrust loading in one axial direction and the other row being capable of taking thrust loading in the other axial direction, said process comprising: causing the rolling elements of the first row to seat against the raceways for that row; applying a force to one of the members in the direction which causes the force to be transferred to the other member through the seated rolling elements of the first row, the force being of sufficient magnitude to move the two members and the first row in unison in one axial direction against a spring-like reaction force applied to said other member; thereafter holding said other member in a fixed axial position; thereafter moving said one member in the axial direction opposite to that which caused the rolling elements of the first row to seat against their raceways, whereby a clearance is established between the rolling elements of the first row and its raceways; causing the rolling elements of second row to seat against the raceways for the second row; thereafter moving the rolling elements of the second row axially relative to said other member to cause said one member to move axially with respect to said other member in the direction which reduces the clearance of said first row; determining the adjustment of the first row remote therefrom; and terminating the relative axial movement of the rolling elements of the second row when the adjustment reaches a prescribed magnitude.

16. The process according to claim 15 wherein said one member is positioned against and moves with shiftable element, and wherein the bearing adjustment is measured at the shiftable element.

17. The process according to claim 15 wherein the shiftable element seats against an anvil when said other member is held in the fixed axial position and before said one member is moved in the opposite axial direction; and wherein the adjustment is determined by measuring the distance between the shiftable element and the anvil.

* * * * *